(12) United States Patent
Yip et al.

(10) Patent No.: US 6,985,319 B2
(45) Date of Patent: Jan. 10, 2006

(54) PATTERN-BASED DEFECT DESCRIPTION METHOD

(75) Inventors: Ying Ee Yip, Singapore (SG); Aik Chuan Lim, Singapore (SG); Yong Peng Chng, Singapore (SG); Steven TianChye Cheok, Singapore (SG); Wei Loon Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 599 days.

(21) Appl. No.: 09/851,767

(22) Filed: May 9, 2001

(65) Prior Publication Data

US 2001/0055172 A1 Dec. 27, 2001

Related U.S. Application Data

(60) Provisional application No. 60/205,925, filed on May 22, 2000.

(51) Int. Cl.
*G11B 5/09* (2006.01)

(52) U.S. Cl. .................................................... 360/48
(58) Field of Classification Search .................. 360/48, 360/31, 25, 53; 714/723, 710, 711
See application file for complete search history.

(56) References Cited

U.S. PATENT DOCUMENTS

| | | |
|---|---|---|
| 4,805,048 A | 2/1989 | Takeuchi |
| 4,914,530 A | 4/1990 | Graham et al. |
| 5,146,571 A | 9/1992 | Logan |
| 5,212,677 A | 5/1993 | Shimote |
| 5,367,652 A | 11/1994 | Golden et al. |
| 5,541,903 A | 7/1996 | Funahashi et al. |
| 5,615,190 A | 3/1997 | Best |
| 5,745,313 A * | 4/1998 | Sliger .......................... 360/48 |
| 5,798,883 A | 8/1998 | Kim |
| 5,812,755 A | 9/1998 | Kool et al. |
| 5,822,142 A | 10/1998 | Hicken |
| 5,870,243 A | 2/1999 | Ukani et al. |
| 5,889,631 A | 3/1999 | Hobson |
| 5,937,435 A | 8/1999 | Dobbek et al. |
| 6,122,238 A | 9/2000 | Langenskiold |
| 6,212,647 B1 | 4/2001 | Sims, III et al. |
| 6,223,303 B1 | 4/2001 | Billings et al. |

\* cited by examiner

*Primary Examiner*—David Hudspeth
*Assistant Examiner*—Glenda P. Rodriguez
(74) *Attorney, Agent, or Firm*—David K. Lucente; Derek J. Berger

(57) ABSTRACT

The present invention provides a method of describing defects that requires less memory space than conventional methods. Entries of a first defect table are sorted according to the type of track layout, or zones. They are then grouped into clusters. Each cluster is characterized by a set of new parameters, including a starting sector, a scratch parameter, a span parameter, and an angle parameter. The new parameters are stored in a second table, replacing the corresponding entries in the first table. In this manner, a single entry in the second table replaces one or more entries in the first table with one entry in the first table.

16 Claims, 3 Drawing Sheets

PATTERN-BASED DEFECT DESCRIPTION METHOD

RELATED APPLICATIONS

The present application claims benefit of the U.S. provisional patent application No. 60/205,925, filed May 22, 2000.

FIELD OF THE INVENTION

The present invention relates generally to disc drives. More particularly, the present invention relates to a method for describing defects found in the recording media.

BACKGROUND OF THE INVENTION

During certification of disc drives, media defects are identified and their addresses are stored in a reserve part of the recording media in the form of a defect table. Upon power-on of the disc drive, the defect table is retrieved and stored in a buffer memory, thus enabling the drive electronics to skip over the defective sectors during disc drive operations.

As drive capacities continue to grow rapidly, the number of media defects also increase. Although more of the recording media can be set aside for storing the defect table, increasing the buffer memory for storing defect information is a very costly option. Currently, a scratch across N tracks in the radial direction of the disc will require N number of defect table entries to represent the defects. With the average tracks per inch (tpi) projected to hit 100,000 tpi, a quarter-inch radial scratch will require 25,000 defect entries to represent it. This creates a very large memory requirement for storing only the defect table.

The U.S. Pat. No. 5,212,677 issued to Shimote et al. on May 18, 1993, describes an apparatus for conducting visual inspection of surface defects. The apparatus groups neighboring defects into clusters and determines the size of each clusters. Although a method of identifying and storing information on cluster-like defects is taught, it does not provide a compressed description of scratch-like defects, particularly irregularly shaped defects or defects that run across a number of tracks.

Scratch-filling algorithms are often applied during drive certification to pad existing defects to prevent the growth of these defects. This involves marking good sectors neighboring the defective sectors as defective sectors. As a result, the final defect table after drive certification is usually bigger than the original defect table.

To cope with the growing number of defects in high-density disc drives, there is a need for a more compact method of storing the defect table.

SUMMARY OF THE INVENTION

The present invention provides a method of describing defects that requires less memory space than conventional methods. At the end of certification process, defects captured are stored in a certification log which is referred to as a first defect table in this discussion. A conversion process is carried out to convert the certification log to a compressed defect table, The compressed defect table is referred to as a second defect table. This second defect table will be stored in the buffer and used by the firmware to skip over defects during operation. The conversion starts with sorting the entries of a first defect table according to the type of track layout, or zones. They are then grouped into clusters. Each cluster is characterized by a set of new parameters, including a starting sector, a scratch parameter, a span parameter, and an angle parameter. The new parameters are stored in a second table, replacing the corresponding entries in the first table. In this manner, a single entry in the second table replaces one or more entries in the first table. In particular, as defective sectors in different tracks may be represented by one single entry in the second table, the present method is more efficient in representing defects caused by scratches on the discs.

In a preferred embodiment, defect-padding techniques may be incorporated. The invention offers an additional advantage over the prior art in that even after defect padding, the number of defect entries may be kept constant or even further reduced.

DETAILED DESCRIPTION

Figure 1:
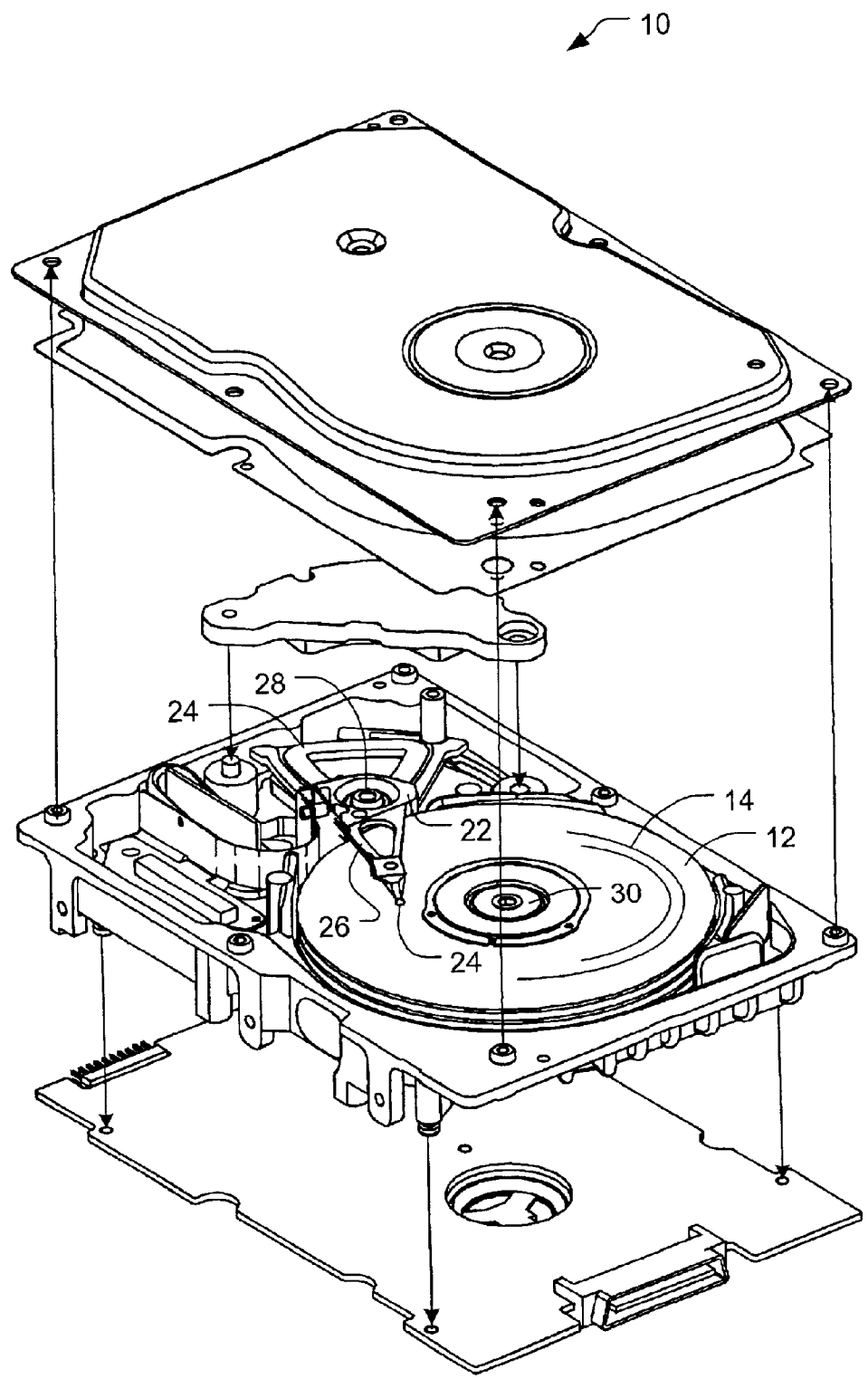
FIG. 1 is a perspective view of a disc drive.

Preferred embodiments of the present invention will now be described with reference to the drawings. Referring first to FIG. 1, there is shown a disc drive 10, such as one in which the present invention may be implemented.

The disc drive 10 includes at least one disc 12 with surfaces on which data can be stored. Data is generally stored in concentric tracks 14, a few of which are illustrated in FIG. 1. Each track is divided into sectors 18, each being an addressable unit of data storage space.

To read or write data to the disc 12, a head 24 is first brought into position by an actuator 22. The actuator 22 may be motivated by a voice coil motor 20 that rotates the actuator arm 26 about a pivot 28 so that the head 24 supported at the end of the actuator arm 26 comes to rest over the particular track. The disc 12 is usually annular and mounted on a spindle motor 30. During a read or write operation, the disc 12 is rotated by the spindle motor 30 so that the appropriate sectors are brought into proximity with the head 24.

To pack more data into a given track area, track widths are reduced. As a result, a small scratch on the disc surface may render numerous sectors across a number of tracks unsuitable for data storage. Other irregularities on the disc surface may also result in defective sectors. Once a sector is identified to be defective, its address is stored in a defect table so that it will not be utilized for data storage. The defect table may be stored on the disc, or when the disc drive is in operation, in a buffer memory.

A most preferred embodiment of the present invention involves providing a second defect table to replace entries in the first defect table. The first defect table stores the addresses of defective sectors in a conventional manner which typically requires at least one defect entry for each contiguous group of defective sectors on the same track. For the purpose of illustration, Table 1 shows the defect entries in the first defect table corresponding to the defective sectors which are shown as single-hatched boxes 52 in FIG. 2.

TABLE 1

| Cylinder | Head | Sector | Span |
|---|---|---|---|
| 1 | 2 | 1 | 1 |
| 2 | 2 | 2 | 1 |
| 3 | 2 | 3 | 1 |
| 4 | 2 | 4 | 1 |
| 5 | 2 | 5 | 1 |
| 6 | 2 | 6 | 1 |

The cylinder number 60 identifies the track. The head number indicates the disc surface concerned. In combination with the sector number 62, the location of a defective sector 52 can be identified. The span number in this example is "1" because only one sector is defective in each track.

Figure 2:
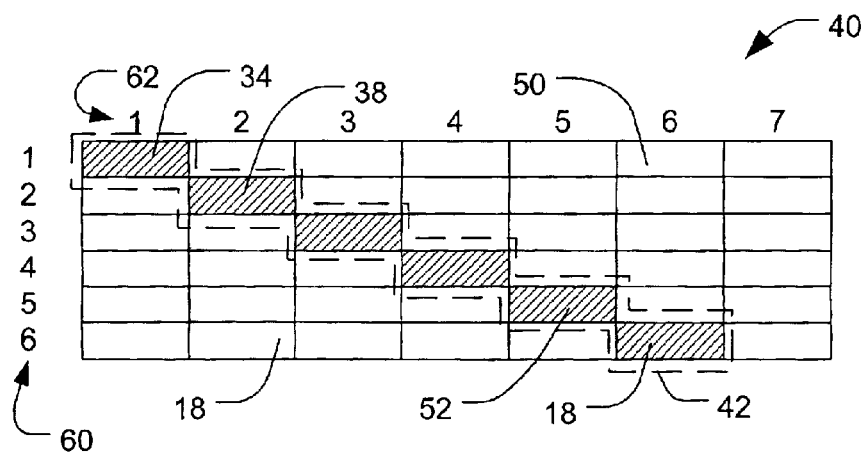
FIG. 2 is a diagrammatic representation of defective sectors in a zone to which the present invention may be applied.

To further maximize drive capacity, the tracks may be grouped into zones with data written at different rates for the various zones, using the known technique of zone-bit recording. To simplify the compression procedure, the sectors are analyzed zone by zone. To do this, the defect entries in the first defect table are sorted by their zones. For the purpose of illustration, it is assumed that FIG. 2 shows all the sectors 18 in one zone 40, where the unshaded boxes 50 represent good sectors. All the defective sectors in the same zone are then grouped into one or more clusters. In this example, all the defective sectors are grouped into one cluster 42.

For each cluster, one of the defective sectors is chosen to be a reference sector 34. Preferably, the reference sector, or the starting sector, is the sector having the smallest cylinder number and the smallest sector number in that cylinder. Alternatively, the starting sector can be taken to be the sector with the largest address.

From Table 1, which represents defect entries in the first defect table, a pattern is derived from the location of the defective sectors belonging to the same cluster 42. The pattern is represented by a set of parameters, which preferably include the location of the starting sector, a scratch parameter, an angle parameter and a span parameter. For example, it can be observed that, beginning from the starting sector 34, the next defective sector 38 is one sector away on the adjacent track. A possible pattern that may be derived is represented by a single set of parameters in Table 2 below.

TABLE 2

| Cylinder | Head | Sector | Scratch | Angle | Span |
|---|---|---|---|---|---|
| 1 | 2 | 1 | 6 | 1 | 1 |

The set of parameters describing the pattern is stored in a second defect table. This one entry in the second defect table thus replaces the six entries in the first defect table.

In this manner, the present invention is able to compress the representation of numerous defective sectors, even where the defective sectors run across several tracks.

Figure 3:
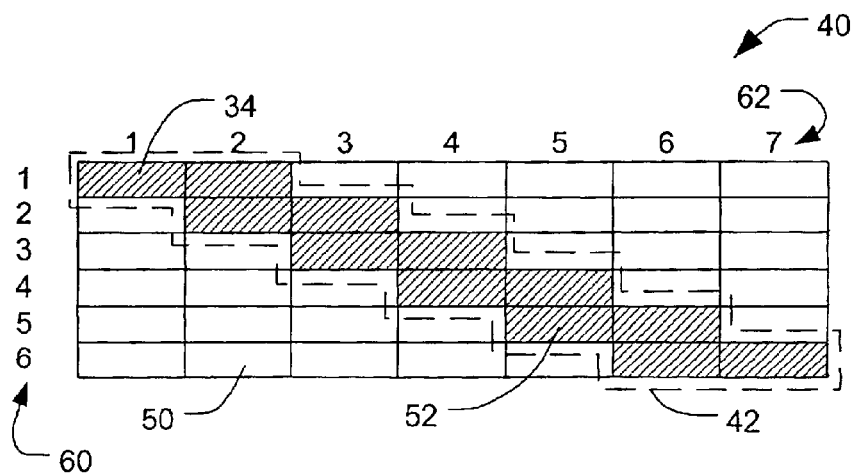
FIG. 3 shows one possible distribution of defective sectors.

Another example will be described with the aid of FIG. 3, which shows, among the good sectors 50, defective sectors 52 resulting from a scratch on the disc surface. A conventional method of defect representation may produce a first defect table as given below in Table 3.

TABLE 3

| Cylinder | Head | Sector | Span |
|---|---|---|---|
| 1 | 2 | 1 | 2 |
| 2 | 2 | 2 | 2 |
| 3 | 2 | 3 | 2 |
| 4 | 2 | 4 | 2 |
| 5 | 2 | 5 | 2 |
| 6 | 2 | 6 | 2 |

These defective sectors 52 are grouped together to form a cluster 42. Using the same rule as before, a starting sector is chosen 34. Alternatively, the starting sector may be chosen by some other rules. Here, the sector having cylinder number=1 and sector number=1 is chosen to be the starting sector.

According to the present invention, the cluster of defective sectors may be represented by a single set of parameters stored in a second defect table, as shown by Table 4. The span parameter is "2" to indicate the width of the scratch.

TABLE 4

| Cylinder | Head | Sector | Scratch | Angle | Span |
|---|---|---|---|---|---|
| 1 | 2 | 1 | 6 | 1 | 2 |

Figure 4:
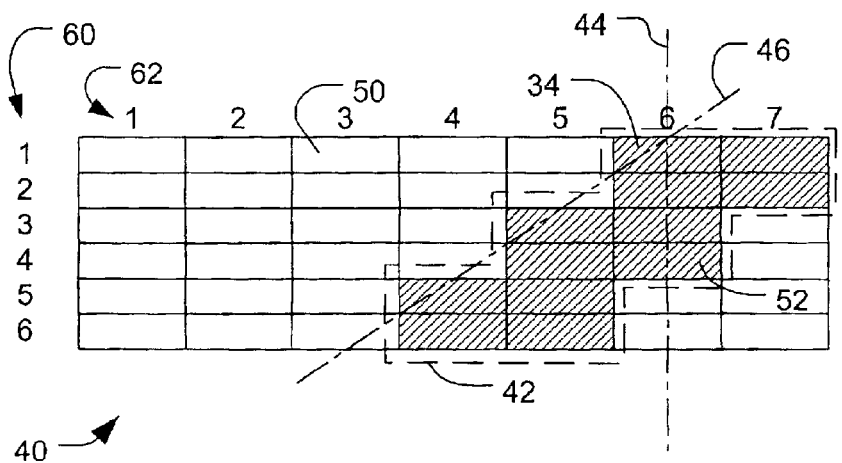
FIG. 4 shows another possible arrangement of defective sectors in a zone.

FIG. 4 illustrates another cluster 42 of defective sectors 52 which, according to the present invention, may be represented by a single defect entry as shown in Table 5.

TABLE 5

| Cylinder | Head | Sector | Scratch | Angle | Span |
|---|---|---|---|---|---|
| 1 | 2 | 6 | 6 | −2 | 2 |

The angle parameter may be derived by various methods. In the foregoing examples, it is taken to be the tangent of the angle between a radial line 44 on the disc and an imaginary line 46 drawn from the starting sector to pass through the first defective sector in subsequent tracks.

Figure 5:
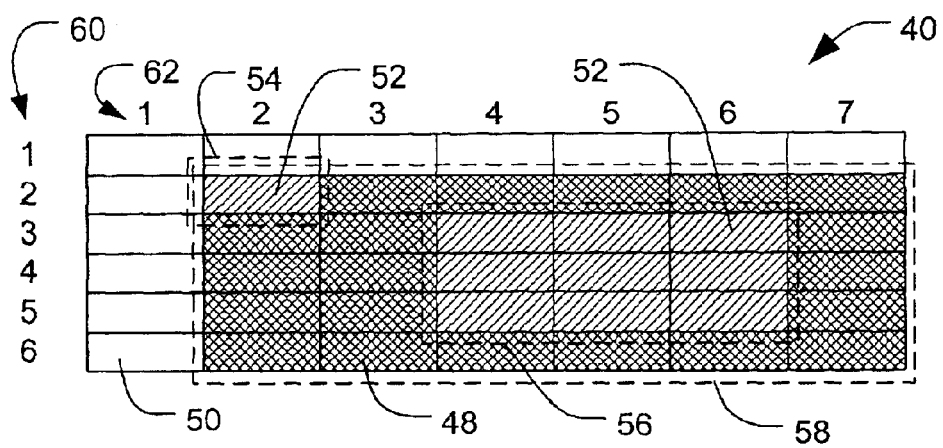
FIG. 5 illustrates yet another possible distribution of defective sectors.

FIG. 5 shows a situation where there are defective sectors 52 that are not adjacent to at least one other defective sector in the same zone 40. Both the double-hatched boxes 48 and the unshaded boxes 50 represent good sectors. The single-hatched boxes 52 represent defective sectors. A conventional defect table may be represented by Table 6.

TABLE 6

| Cylinder | Head | Sector | Span |
|---|---|---|---|
| 2 | 2 | 2 | 1 |
| 3 | 2 | 4 | 3 |
| 4 | 2 | 4 | 3 |
| 5 | 2 | 4 | 3 |

According to the present invention, two clusters 54, 56 may be defined: one consisting of only one defective sector and another consisting of the remaining nine defective sectors. The four defect entries may therefore be replaced by two entries in the second defect table, such as one shown in Table 7.

TABLE 7

| Cylinder | Head | Sector | Scratch | Angle | Span |
|---|---|---|---|---|---|
| 2 | 2 | 2 | 1 | N/A | 1 |
| 3 | 2 | 4 | 3 | 0 | 3 |

An alternative embodiment may incorporate defect-padding techniques so as to prevent the growth of a defect. Consider the example in FIG. 5. Incorporating defect padding, the entries in the second table are modified to include the adjacent sectors that are not currently defective. In this example, the good sectors represented by double-hatched boxes 48 are included in the cluster 58 for the purpose of defect padding. The defect entry using the pattern representation may then be as shown in Table 8.

TABLE 8

| Cylinder | Head | Sector | Scratch | Angle | Span |
|---|---|---|---|---|---|
| 2 | 2 | 2 | 5 | 0 | 6 |

Figure 6:
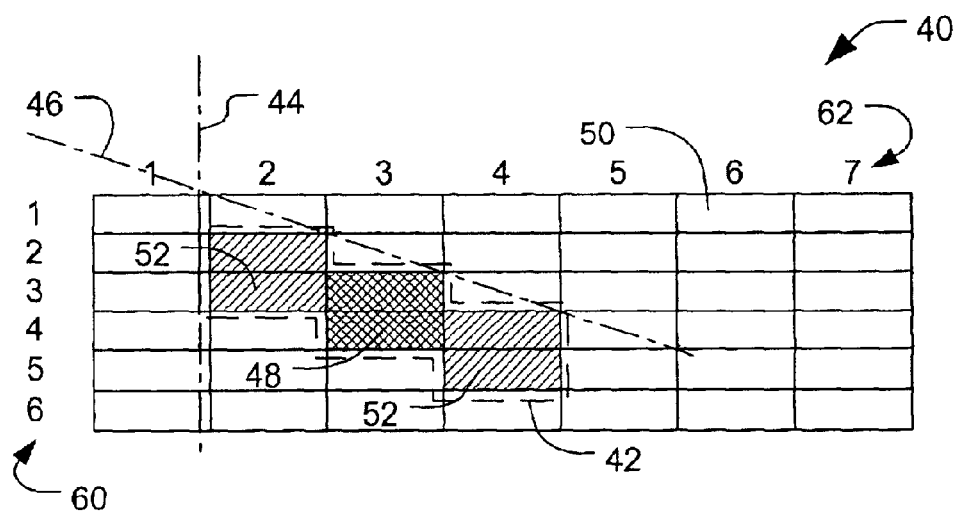
FIG. 6 shows a possible distribution of defective sectors for the purpose of illustrating how the present invention may be applied to obtain further compression of the defect description.

Although the number of tagged sectors has increased, the memory space required to store the identity of the tagged sectors has not. Depending on the pattern chosen, the degree of compression may be increased. Consider the example in FIG. 6, again, the double-hatched boxes 48 and the unshaded boxes 50 represent good sectors while the single-hatched boxes 52 represent defective sectors. Instead of replacing the four defect entries in Table 9 with the two entries in Table 10, an alternative pattern can be applied such that only one defect entry is required. For example, some of the good sectors 48 adjacent the defective sectors 42 may be considered as part of the same cluster, after the manner of defect padding, to produce a single entry as shown in Table 11.

TABLE 9

| Cylinder | Head | Sector | Span |
|---|---|---|---|
| 2 | 2 | 2 | 1 |
| 3 | 2 | 2 | 1 |
| 4 | 2 | 4 | 1 |
| 5 | 2 | 4 | 1 |

TABLE 10

| Cylinder | Head | Sector | Scratch | Angle | Span |
|---|---|---|---|---|---|
| 2 | 2 | 2 | 2 | 0 | 1 |
| 4 | 2 | 4 | 2 | 0 | 1 |

TABLE 11

| Cylinder | Head | Sector | Scratch | Angle | Span |
|---|---|---|---|---|---|
| 2 | 2 | 2 | 4 | 2 | 2 |

Therefore, the present invention may be applied to compress the description of defective sectors which do not lie on contiguous tracks or which are not adjacent to each other. This is particularly useful for compressing defect entries for scratches, and can be extended to other defects which may be roundish or irregularly shaped.

Alternatively, preferred embodiments of the invention may be described as follows:

In a disc drive 10 having at least one disc 12 having a plurality of addressable sectors arranged in a plurality of tracks 14 on a surface of the disc such that data is capable of being written to and read from the sectors, there is provided a method of storing information on defective sectors 52. The method involves defining a cluster 42 comprising at least one defective sector 52, selecting one sector from the cluster to be a reference sector 34, and defining parameters with reference to the reference sector 34. The parameters chosen describe the shape and size of the cluster. The method further includes storing the parameters with an address of the reference sector 34. Where the sectors are categorised into zones 40 such that data is written to and read from different zones at different rates, the method is applied by first sorting defective sectors 52 by zone before performing the aforementioned steps separately for each zone 40.

The cluster 58 may be defined such that it includes at least one non-defective sector 48. According to one embodiment, the sector with the smallest address is selected to be the reference sector 34. In another embodiment, the sector with the largest address is selected to be the reference sector 34.

Preferably, a scratch parameter characterizing the number of tracks 14 covered by the cluster 42 is one of the parameters defined. Another parameter that is defined includes a span parameter that characterizes the number of sectors 18 covered by the cluster 42 along each track 14. The method further includes defining an angle parameter characterizing the angluar deviation of a side 46 of the cluster from a reference line 44 intersecting the reference sector 34. The reference line may be defined by a radial line 44.

The foregoing disclosure is intended to be illustrative only. It will be appreciated by those skilled in the art that variations may be made without departing from the scope and spirit of the invention. For example, different rules on cluster formation may be implemented to incorporate various defect-padding techniques, other than those described in the foregoing.

What is claimed is:

1. In a disc drive comprising at least one disc having a plurality of addressable sectors arranged in a plurality of tracks on a surface of the disc, the sectors being categorised into zones such that data is capable of being written to and read from different zones at different rates, a method of storing information on defective sectors comprising steps of:
   (a) sorting defective sectors by zone;
   (b) defining a cluster comprising at least one defective sector;
   (c) selecting one sector from the cluster to be a reference sector;
   (d) defining parameters with reference to the reference sector, the parameters describing the shape and size of the cluster;
   (e) storing the parameters with an address of the reference sector; and
   (f) performing the steps (b) to (e) separately for each zone.

2. A method of claim 1 wherein the defining step (b) further comprises a step of including at least one non-defective sector in the cluster.

3. A method of claim 1 wherein the selecting step (c) includes selecting the sector with the smallest address to be the reference sector.

4. A method of claim 1 wherein the selecting step (c) includes selecting the sector with the largest address to be the reference sector.

5. A method of claim 1 wherein the defining step (d) further includes defining a scratch parameter characterizing the number of tracks covered by the cluster.

6. A method of claim 1 wherein the defining step (d) further includes defining a span parameter characterizing the number of sectors covered by the cluster along each track.

7. A method of claim 1 wherein the defining step (d) further includes defining an angle parameter characterizing the angular deviation of a side of the cluster from a reference line intersecting the reference sector.

8. A method of claim 7 further comprising defining a radial line to be the reference line.

9. A method comprising steps of:
   (a) defining a cluster comprising at least one defective location;
   (b) selecting one location from the cluster to be a reference location;
   (c) defining parameters with reference to the reference location; and
   (d) storing the parameters with an address of the reference location.

10. The method of claim 9 wherein the parameters are stored in a storage apparatus.

11. The method of claim 9 wherein the locations are sectors.

12. The method of claim 9 further comprising the steps of:
    sorting a plurality of defective locations into zones; and
    performing steps a–d for each zone.

13. A method comprising the steps of:
    (a) defining a defect cluster that includes a reference location; and
    (b) determining defect parameters relative to the reference location.

14. The method of claim 13 further comprising the step of storing the parameters with an address of the reference location.

15. The method of claim 14 wherein the parameters and address of the reference location are used to determine defect information.

16. The method of claim 14 wherein the defect information corresponds to defects of a storage device.

* * * * *